US009971740B2

(12) United States Patent
Deguzman et al.

(10) Patent No.: US 9,971,740 B2
(45) Date of Patent: *May 15, 2018

(54) DYNAMIC WEBPAGE IMAGE

(71) Applicant: Excalibur IP, LLC, New York, NY (US)

(72) Inventors: Lawrence Anthony Deguzman, Santa Clara, CA (US); Igor P. Zingerman, Fremont, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/077,441

(22) Filed: Mar. 22, 2016

(65) Prior Publication Data

US 2016/0203106 A1   Jul. 14, 2016

Related U.S. Application Data

(63) Continuation of application No. 13/451,813, filed on Apr. 20, 2012, now Pat. No. 9,317,623.

(51) Int. Cl.
| | |
|---|---|
| *G06F 17/00* | (2006.01) |
| *G06F 17/21* | (2006.01) |
| *G06F 17/22* | (2006.01) |
| *G06F 17/24* | (2006.01) |
| *G06T 13/80* | (2011.01) |
| *G06F 17/30* | (2006.01) |
| G06F 9/44 | (2018.01) |

(52) U.S. Cl.
CPC ........ *G06F 17/211* (2013.01); *G06F 17/2205* (2013.01); *G06F 17/2247* (2013.01); *G06F 17/243* (2013.01); *G06F 17/30905* (2013.01); *G06T 13/80* (2013.01); *G06F 9/4443* (2013.01); *G06F 9/451* (2018.02)

(58) Field of Classification Search
CPC ......................... G06F 17/30905; G06F 9/4443
USPC ................................ 715/202, 234, 239, 243
See application file for complete search history.

(56) References Cited

U.S. PATENT DOCUMENTS

| | | | |
|---|---|---|---|
| 7,430,434 | B2 | 9/2008 | Choi et al. |
| 8,397,212 | B2 | 3/2013 | Chijiiwa |
| 9,317,623 | B2 * | 4/2016 | Deguzman ........ G06F 17/30905 |
| 2004/0177327 | A1 | 9/2004 | Kieffer |
| 2005/0097452 | A1 | 5/2005 | Eross |
| 2011/0258535 | A1 | 10/2011 | Adler, III et al. |
| 2011/0289419 | A1 | 11/2011 | Yu et al. |
| 2013/0185624 | A1 | 7/2013 | Appleyard et al. |
| 2013/0311862 | A1 | 11/2013 | Malla |
| 2014/0026023 | A1 | 1/2014 | Cabanier |

* cited by examiner

*Primary Examiner* — Stephen Hong
*Assistant Examiner* — Matthew Ludwig
(74) *Attorney, Agent, or Firm* — Brinks Gilson & Lione

(57) ABSTRACT

A system for converting formatting of display object, including a logic (e.g., a computing device) that can be operable to traverse and record a part of source code or binary data related to a first visible item displayed on a visual output device. The logic can then convert a first data type or data structure that includes the recorded part of source code or binary data to a second data type or data structure that still includes the recorded part of source code or binary data, where the second data type or data structure is related to a second visible item displayable on the visual output device.

20 Claims, 7 Drawing Sheets

DYNAMIC WEBPAGE IMAGE

CROSS-REFERENCE TO RELATED APPLICATIONS

This application is a continuation of U.S. patent application Ser. No. 13/451,813, filed on Apr. 20, 2012, the entirety of which is hereby incorporated by reference herein.

BACKGROUND

1. Field

Example embodiments relate to images, such as screenshots.

2. Description of the Related Art

Images such as screenshots, also known as screen dumps, screen captures, or screen grabs, are used in various manners to capture visible items displayed on a visual output device, such as a monitor or television. Visible items can include any item displayed on a visual output device, for example, such items can include a displayed webpage or a displayed component of a webpage.

Screenshot technology, typically implemented through software, hardware, or a combination thereof, can be found on various electronic devices and operating systems. This versatility allows for exploiting screenshot technology for all sorts of computerized functions. For example, a screenshot can be taken of a displayed component of a webpage and then that screenshot can be further processed or even converted into another format. For example, a screenshot could be taken of a displayed webpage and then that screenshot is converted into a Flash object.

SUMMARY

A system for converting formatting of display object, including logic (e.g., a computing device) that can be operable to traverse and record a part of source code or binary data related to a first visible item displayed on a visual output device. The logic can then convert a first data type or data structure that includes the recorded part of source code or binary data to a second data type or data structure that still includes the recorded part of source code or binary data, where the second data type or data structure is related to a second visible item displayable on the visual output device.

Also, the logic can render the second visible item for display on the visual output device, wherein the second visible item comprises interactivity, appearance, and position similar to the first visible item. Both the first visible item and the second visible item may be part of a website. Furthermore, the first data type or data structure may be formatted for a web browser, and the second data type or data structure may be formatted for a Flash Player.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION OF EXAMPLE EMBODIMENTS

Figure 1:
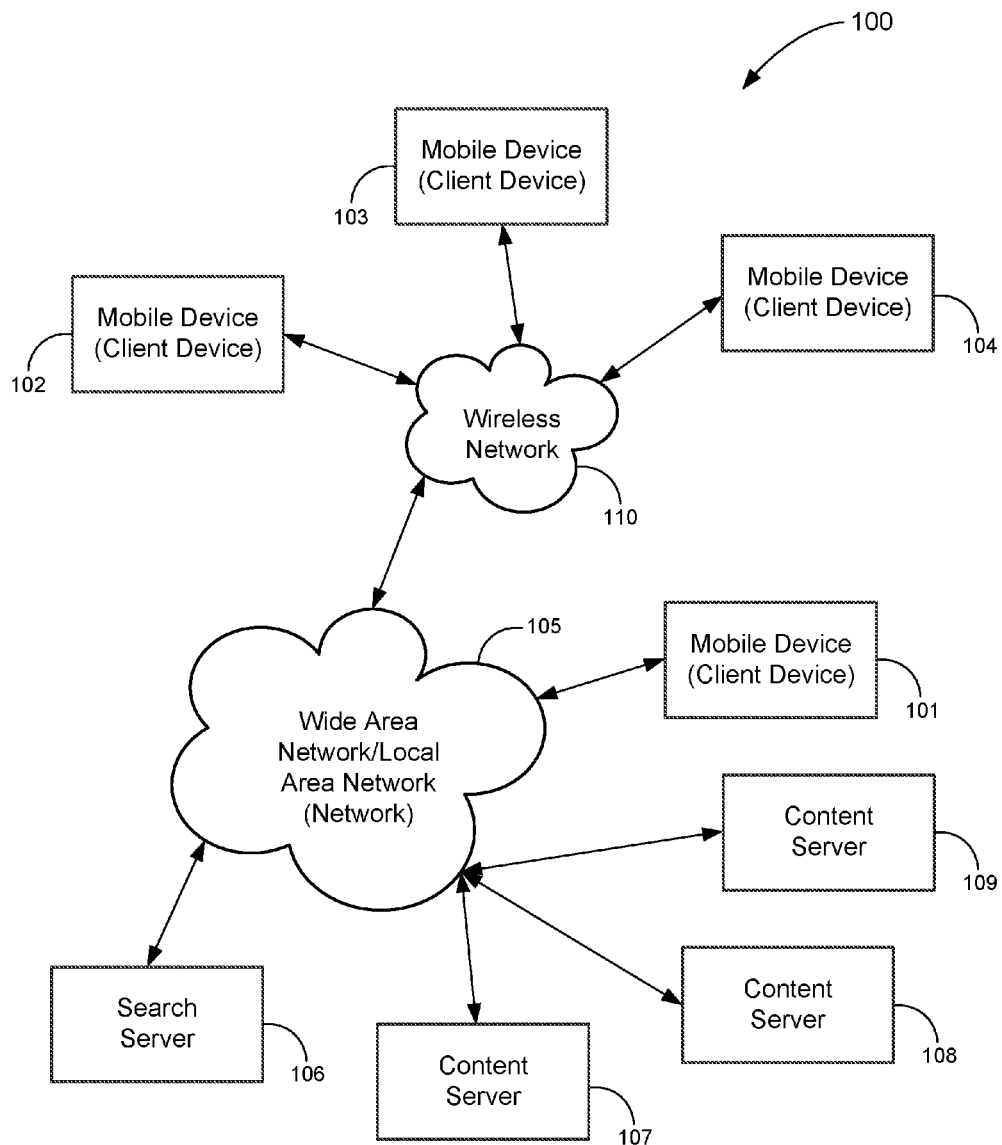
FIG. 1 illustrates a block diagram of one embodiment of a network that can implement one embodiment of the DSS.

As mentioned above, a screenshot can be taken of a displayed part of a webpage and then that screenshot can be further processed or even converted into another format. For example, a screenshot could be taken of a displayed webpage and then that screenshot is converted into a Flash object, where a Flash object may be an object of class of an object-oriented programming language supported by Adobe Flash, or an a visual object rendered by an Adobe Flash Player. Although various additions and changes can be made to the screenshot, e.g., change colors of parts, edit text, add animations and links, such additions and changes can require programming or manual editing of the screenshot. For example, a screenshot of part of a webpage, where the part has hyperlinks or dynamic components, can be converted into a suitable format for insertion onto another webpage; however, that converted screenshot remains a static image until a programmer adds hyperlinks or dynamic components to the image, e.g., adding the hyperlinks or dynamic components to the image through mapping. Therefore, it is of great interest to develop a system that at least enables some automated additions and changes to an image of a part of a webpage, especially additions of hyperlinks or dynamic components to the image that already existed on the webpage.

Described herein is a system that can perform such functionality (hereinafter referred to as the dynamic screenshot system or the DSS) by way of a method. Such a method can include traversing and recording a source code or binary data related to a first visible item displayed on a visual output device (e.g., traversing and recording source code of a part of a webpage). The method can also include converting a first data type or data structure that includes the recorded source code or binary data to a second data type or data structure that still includes the recorded source code or binary data (e.g., converting a first data structure that includes code corresponding to HTML source code to a second data structure, where the second data structure includes the same HTML source included in the first data structure). Further, the method can include generating a second source code or binary data from the second data type. Also, the method can include displaying on the visual output device a second visible item that at least has similar interactivity, appearance, and position as the first visible item. For example, the method can generate an image, such as a screenshot, but instead of generating a static image, the method can generate a dynamic image where components of the image are not static.

For example, the dynamic image can allow a user to zoom in on a particular item of the image or find out more information about the particular item, e.g., by hovering a mouse over the item or clicking on an icon for the item. The dynamic image can also allow a user to browse a multiple level item, e.g., a multiple level directory item of a directory webpage or part of a webpage. Further, for example, the dynamic image can facilitate navigating the levels of the multiple level item without waiting for other components of a graphical user interface to render. This, for example, can make web browsing faster. Furthermore, other advantages of the dynamic image, the aforementioned method for deriving the dynamic image, and the DSS will become apparent from the detailed description below.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The terminology used in the specification is for the purpose of describing particular embodiments only and is not intended to be limiting of example embodiments of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. FIG. 1 illustrates a block diagram of one embodiment of a network 100 that can implement one embodiment of the DSS.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

Now, in order to more specifically describe example embodiments of the present invention, various embodiments of the present invention will be described in detail with reference to the attached drawings. However, the present invention is not limited to the example embodiments, but may be embodied in various forms. In addition, the detailed is not intended as an extensive or detailed discussion of known concepts. As such, details that are known generally to those of ordinary skill in the relevant art may have been omitted or may be handled in summary fashion.

While example embodiments have been particularly shown and described with reference to FIGS. 1-7, it will be understood by one of ordinary skill in the art that various changes in form and details may be made therein without departing from the spirit and scope of example embodiments, as defined by the following claims.

FIG. 1 illustrates a block diagram of one embodiment of a network 100 that can implement one embodiment of the DSS. As shown, FIG. 1, for example, includes a variety of networks, such as local area local area network (LAN)/wide area network (WAN) 105 and wireless network 110, a variety of devices, such as client device 101 and mobile devices 102-104, and a variety of servers, such as content servers 107-109 and search server 106.

A network, such as the network 100, may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Furthermore, a computing device or other related electronic devices may be remotely coupled to a network, such as via a telephone line or link, for example.

A wireless network, such as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
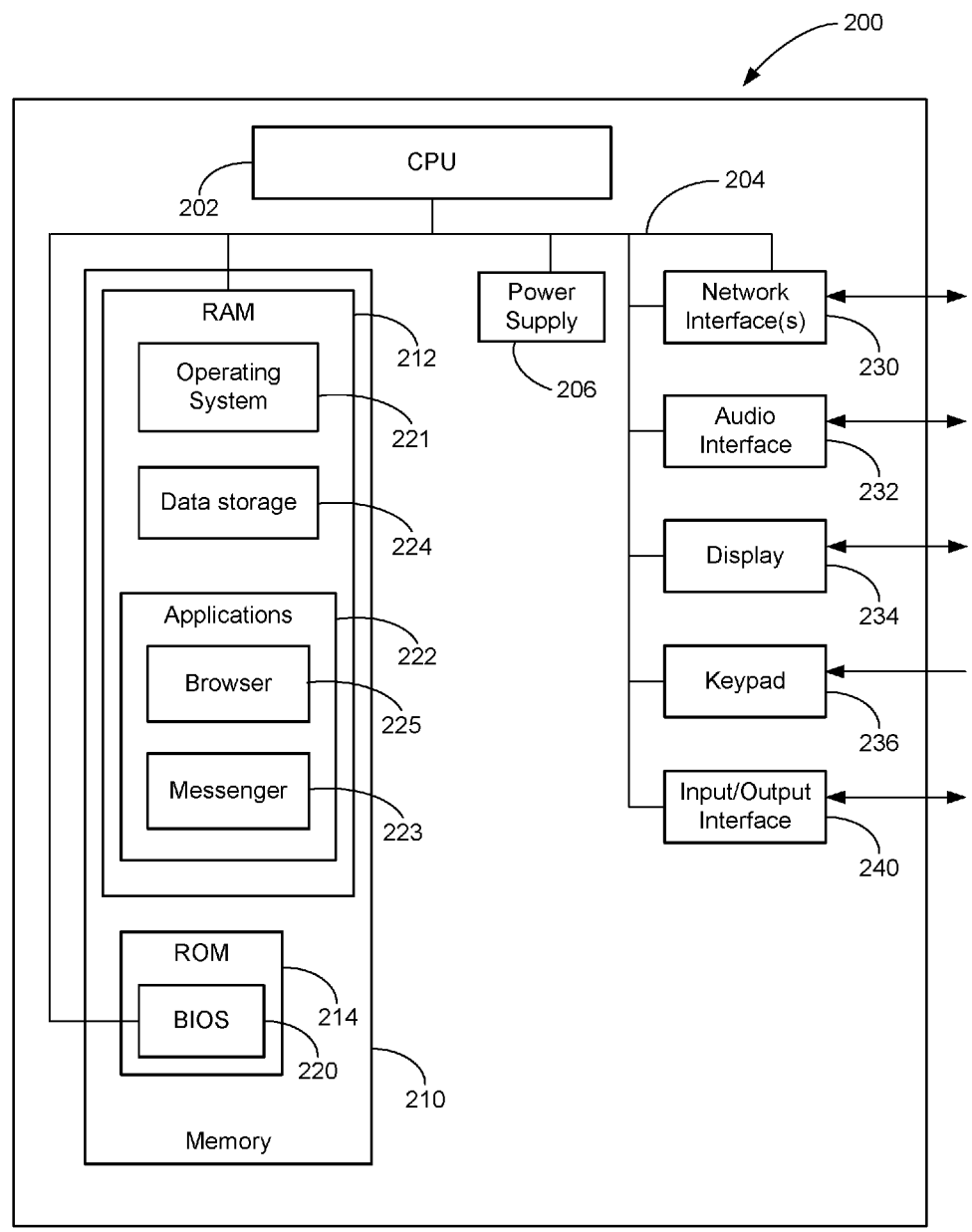
FIG. 2 illustrates a block diagram of one embodiment of an electronic device that can implement an aspect of one embodiment of the DSS.

FIG. 2 illustrates a block diagram of one embodiment of an electronic device 200 that can implement an aspect of one embodiment of the DSS. Instances of the electronic device 200 may include servers, such as servers 106-109 and client devices, such as client devices 101-104. In general, the electronic device 200 can include a processor 202, memory 210, a power supply 206, and input/output components, such as network interface(s) 230, an audio interface 232, a display 234, a key pad or keyboard 236, an input/output interface 240, and a communication bus 204 that connects the aforementioned elements of the electronic device. The network interfaces 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, applications 222, such as a web browser 225 and an instant messenger 223, and instructions for the DSS. The ROM can include BIOS 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and in one embodiment can ease processing performed by the processor 202.

In configurations where the electronic device 200 is a client device, it can include a computing device capable of sending or receiving signals, such as via a wired or a wireless network. A client device may, for example, include a desktop computer or a portable device, such as a cellular phone telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Also, a client device may vary in terms of capabilities or features. Claimed subject matter is intended to cover a wide range of potential variations. For example, a cell phone embodiment may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch sensitive color two dimensional (2D) or three dimensional (3D) display, for example.

Further, a client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

In configurations in which the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Particularly, a content server may include a device that includes a configuration to provide content via a network to another device. A content server may, for example, host a site, such as a social networking site, examples of which may include, without limitation, Flicker, Twitter, Facebook, LinkedIn, or a personal user site (such as a blog, a video blog, an online dating site, etc.). A content server may also host a variety of other sites, including, but not limited to business sites, educational sites, dictionary sites, encyclopedia sites, wikis, financial sites, and government sites.

Further, a content server may provide a variety of services that include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Figure 3:
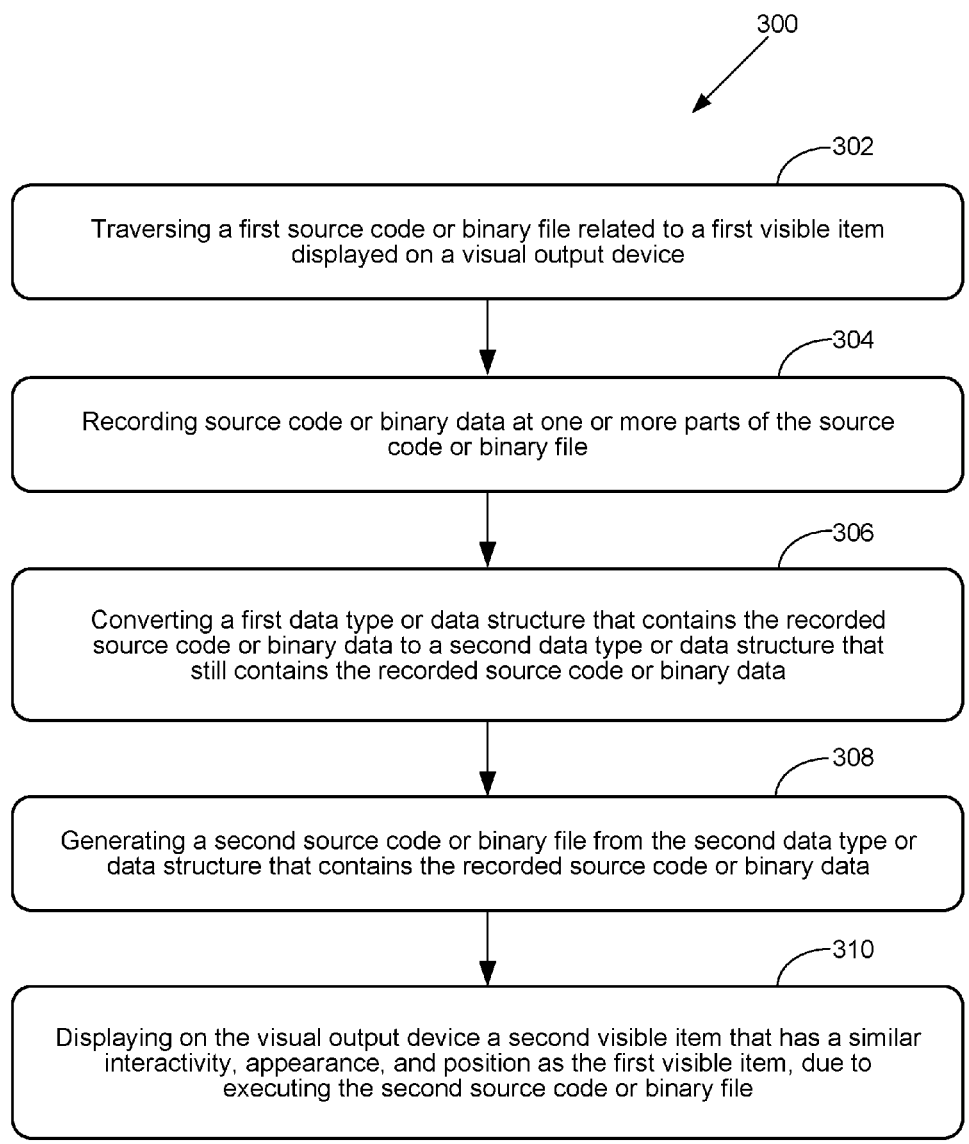
FIG. 3 illustrates a flowchart of an example method performed by an electronic device, such a client device or, in general, the device of FIG. 2.

FIG. 3 illustrates a flowchart of one embodiment of the method performed by the DSS, a method 300, which can also be performed by an electronic device, such as a client device or, in general, the device of FIG. 2. In one embodiment, a processor, such as the processor 202 can perform the method 300 by executing processing device readable instructions encoded in the memory 210. The method 300 begins with traversing a first source code or binary data related to a first visible item displayed on a visual output device, such as the display 234 (at 302). In one embodiment, Javascript embedded in HTML can facilitate traversing a Document Object Model (at DOM) of a web page that includes at least the first source code or binary data related to the first visible item. In addition, in this embodiment, the web page can include modules that the Javascript can facilitate extracting. Next, the method 300 continues with recording source code or binary data at one or more parts of the source code or binary data (at 304). In one embodiment, predetermined target modules of the webpage, possibly denoted by HTML tags, are selected, and string data of these modules are copied into respective Javascript Objects. Next, the method 300 continues with converting a first data type or data structure that contains the recorded respective source code or binary data to a second data type or data structure that still contains the recorded source code or binary data (at 306). In some embodiments, the conversion at 306 can include one or more of processes 408-424 illustrated in FIG. 4 and mentioned below. The method 300 then continues with generating a second source code or binary data from the second data type or data structure that contains the recorded source code or binary data (at 308). In turn, the method continues, due to executing the second source code or binary data, with displaying, on the visual output device, a second visible item that has similar interactivity, appearance, and position as the first visible item (at 310). In some embodiments, the second visible item is rendered by high-level functions of a sub-component of a web browser, such as high-level functions of a Flash Player, that makes requests to lower level functions that render sections of a bitmap for displaying objects. From the point of view of an end user, the second visible item appears to be the first visible item; however, after the method 300, the visible item is no longer render by the same instructions. Therefore, the second visible item can include all the features of the first visible item combined with additional features, such as Flash animation.

Figure 4:
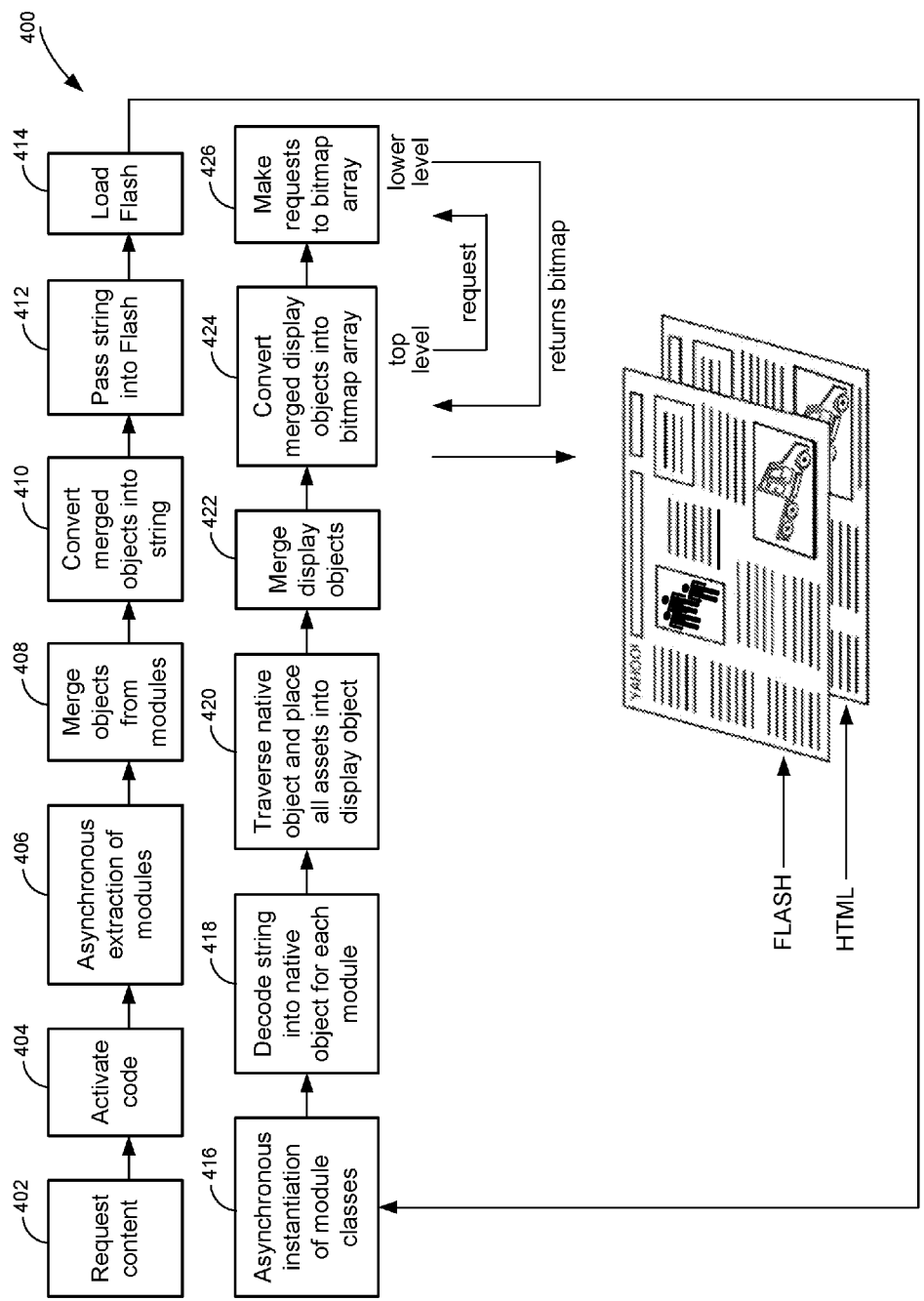
FIG. 4 illustrates a flowchart of another example method performed by an electronic device, such a client device or, in general, the device of FIG. 2.

FIG. 4 illustrates a flowchart of another embodiment of the method performed by the DSS, a method 400, which is also performed by an electronic device, such a client device or, in general, the device of FIG. 2. In particular, the method 400 can be performed by a web browser application, such as web browser 225. The method 400 starts with requesting content, such as requesting Flash content (at 402). The method 400 then continues with activating code, such as Javascript embedded in HTML, which traverses a Document Object Model (at DOM) of a web page that includes the request for content (at 404). Next, the method 400 continues with extracting, asynchronously, modules (e.g., HTML-based modules) included in the web page (at 406). For example, predetermined target modules on the webpage are selected, and string data of these modules are copied into respective Javascript Objects. In one embodiment, where the web page contains HTML header, body, and footer tags, modules can be selected due to each module having its own respective header, body, and footer tags. Next, the method 400 continues with merging the modules' objects into a collective object (at 408). The method 400 then continues with converting the collective object, which can be a well-formed object, into a string, such as a Javascript Object Notation string (at 410). Next, the method 400 continues with passing the string to a sub-component of the browser, such as Flash Player (at 412). Where the string is passed to a Flash Player, it can be passed via a FlashVars object. Then the method 400 continues with loading the sub-component of the browser (at 414), where upon loading the sub-component the string becomes available for processing by the sub-component. For example, where upon embedding a Javascript Object Notation String into a Flash object and loading the Flash Player, the Flash Player can process the JavascriptObject Notation String. Next, the method 400 continues with the sub-component instantiating, asynchronously, classes that control each of the modules, respectively (at 416). For example, the Flash Player may asynchronously instantiate classes that handle each module. Then the method 400 continues with each module independently decoding the string into a native object of the sub-component (or an object that can interact with the sub-component but is not native to the sub-component) (at 418). For example, each module then independently decodes the Javascript Object Notation String into a native Flash Key/Value pair Object. Each module then traverses the native object and places all assets referenced by the native object into a display object (at 420). For example, the Flash Key/Value pair Object is loaded, and assets referenced by this native object are submitted to a Flash display object. Each display object then is dynamically copied into a collective display object, where each individual display object is referenced with respect to placement according to predetermined criteria and attributes of the webpage (at 422). It is from the collective display object that the objects for each module are rendered accordingly on the webpage. After organization of all of the individual modules (which are eventually positioned on the webpage similarly to their original placement), the modules are then converted into an array, such as a bitmap. Then a callback function of the sub-component notifies top-level functions of the web browser or sub-component that all modules have been combined and are ready for rendering (at 424). For example, a callback function of the web browser or sub-component notifies embedded Javascript that all assets have been fully downloaded and rendered. The top-level functions then may in turn make requests to the lower level functions that can render sections of the array (at 426). In one embodiment, the return value of the lower level functions can be in the form of a bitmap that can then be added to a display object list that acts as a queue for displaying objects.

Figure 5:
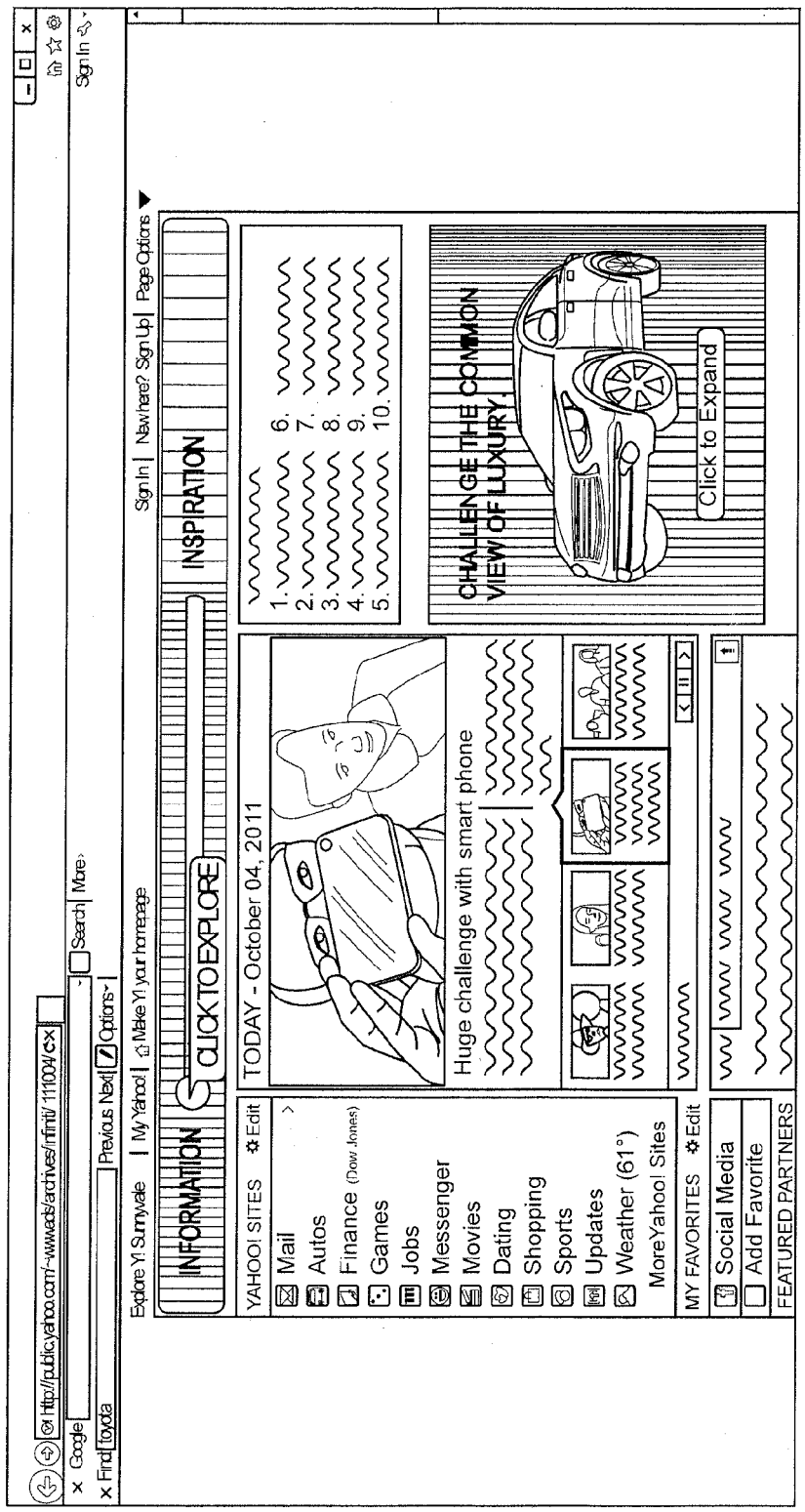
FIG. 5 illustrates an example web browser displaying an example webpage that includes the second visible item referenced in FIG. 3.

FIG. 5 illustrates an example web browser displaying an example webpage that includes a part of or the entire second visible item referenced in FIG. 3 at 310. Alternatively, the displayed webpage can include one or more of the modules (where the modules are rendered to the displayed webpage in FIG. 5) referenced in the description of FIG. 4 at 424. At 424, these modules are associated with a collective display object and renderable by a sub-component of a web browser, such a Flash Player. In FIG. 5, the second visible item or the sub-component renderable modules can appear to be duplicative of the first visible item or the modules referenced in FIG. 4 prior to being processed by the method 400, respectively. However, although the second visible item or the sub-component renderable modules have similar interactivity, appearance, and position as their respective predecessors, these processed aspects of a webpage can also include added features, such as animation features. For example, elements of the second visible item or the sub-component renderable modules can be part of a first frame of an animation, and a Flash Player, for example, can alter the appearance and positioning of these elements via a frame following the first frame (e.g., see FIG. 6), and can eliminate the appearance of these elements via a final frame (e.g., see FIG. 7). Further, in one embodiment, the added animation features do not affect the interactivity of components (such as hyperlinks) of the second visible item or the sub-component renderable modules. Therefore, HTML modules can be encapsulated by Flash objects that can alter the appearance and position of the HTML modules without necessarily eliminating interactivity of the HTML modules, for example.

Figure 6:
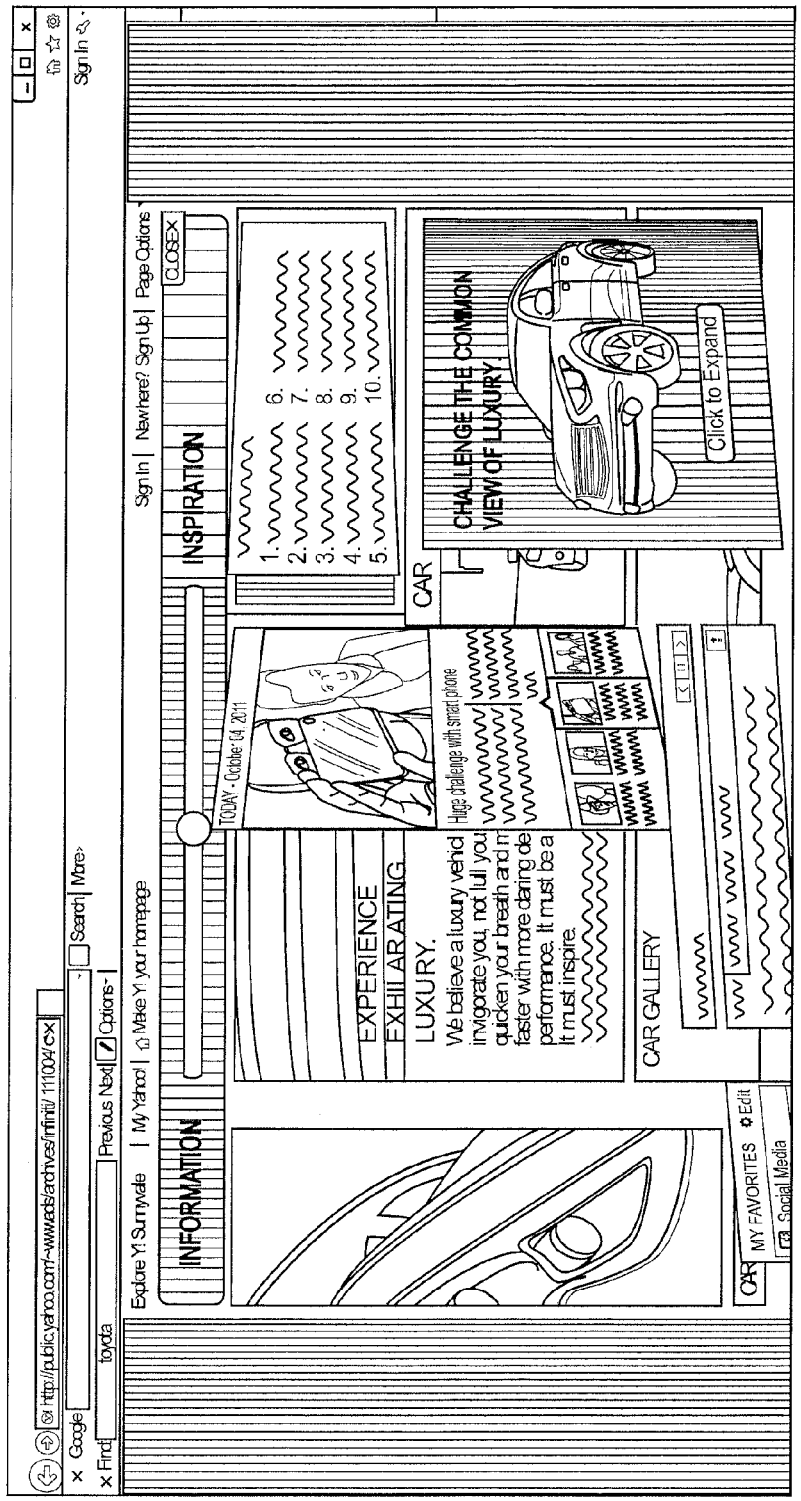
FIG. 6 illustrates the example web browser displaying the example webpage of FIG. 5, but it includes an animation frame following an animation frame included in FIG. 5.

FIG. 6 illustrates the example web browser of FIG. 5 displaying an example webpage that includes either the second visible item resulting from the method 300 or the sub-component renderable modules resulting from the method 400. However, in FIG. 6, the second visible item or the sub-component renderable modules have a different appearance and position, and possibly different interactivity of their predecessors. These differences are due to added animation features that render an animation. For example, in FIG. 6, the elements of the displayed webpage are part of a frame after the first frame of the animation (See FIG. 5).

Figure 7:
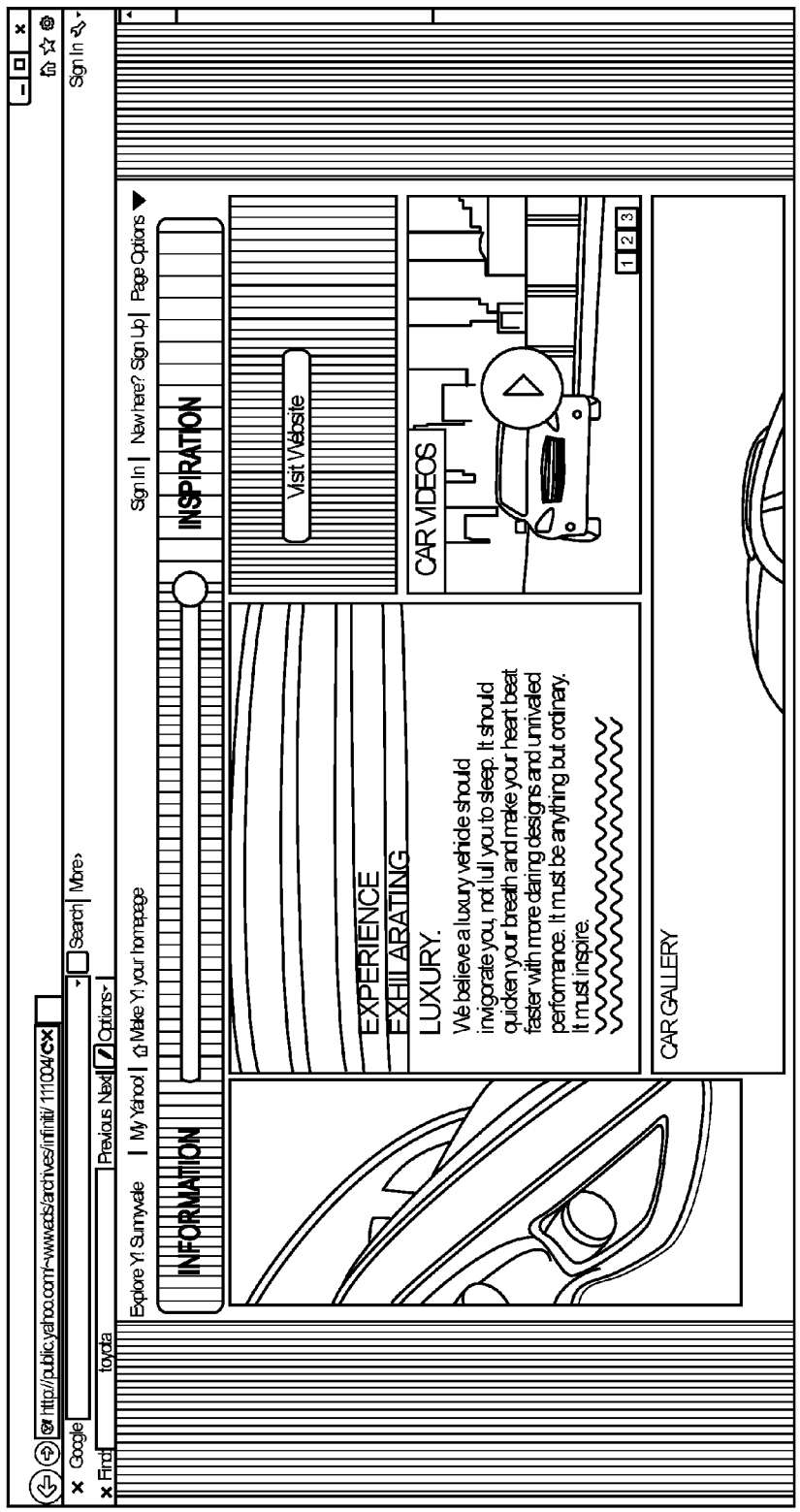
FIG. 7 illustrates the example web browser displaying the example webpage of FIG. 5, but it includes an animation frame following the animation frame included in FIG. 6.

FIG. 7 illustrates another frame of the animation, e.g., a final frame of the animation, rendered by the added animation features. In FIG. 7, in the frame of the animation, parts of the second visible item or the sub-component renderable modules are not visible to the user.

We claim:

1. A method, comprising:
    traversing a document object included in a webpage configured to be generated by a web browser;
    selecting a portion of the document object related to a first plurality of visible items;
    recording, into respective objects according to a first data format, the portion of the document object related to the first plurality of visible items;
    merging the respective objects into a collective object;
    converting the collective object to a multimedia object according to a second data format, wherein the multimedia object is compatible with a corresponding multimedia player;
    decoding the multimedia object into a native object referencing a plurality of displayable assets from the multimedia object;
    generating a display object including the displayable assets; and
    controlling a rendering of a second plurality of visible items corresponding to the displayable assets.

2. The method of claim 1, wherein the first data format is a JAVASCRIPT format and the second data format is a JAVASCRIPT OBJECT NOTATION (JSON) string format.

3. The method of claim 1, wherein controlling the rendering of the second plurality of visible items comprises:
    merging the display object with additional display objects including additional displayable assets;
    converting the merged display object into a bitmap array including the second plurality of visible items; and
    rendering the bitmap array.

4. The method of claim 1, wherein the second plurality of visible items initially has an appearance and position similar to the first plurality of visible items.

5. The method of claim 1, wherein the multimedia object is a FLASH object.

6. The method of claim 5, wherein the corresponding multimedia player is a FLASH player.

7. The method of claim 1, wherein the second plurality of visible items includes animation data not included in the first plurality of visible items.

8. The method of claim 1, wherein the second plurality of visible items includes audio and video data not included in the first plurality of visible items.

9. The method of claim 1, wherein the native object is a native Flash Key/Value pair object.

10. The method of claim 1, further comprising:
loading the multimedia object into the corresponding multimedia player.

11. A system, comprising:
a memory configured to store a document object included in a webpage;
a processor configured to:
communicate with the memory;
traverse the document object;
select a portion of the document object related to a first plurality of visible items;
record, into respective objects according to a first data format, the portion of the document object related to the first plurality of visible items;
merge the respective objects into a collective object;
convert the collective object to a multimedia object according to a second data format, wherein the multimedia object is compatible with a corresponding multimedia player;
decode the multimedia object into a native object referencing a plurality of displayable assets from the multimedia object;
generate a display object including the displayable assets; and
control a rendering of a second plurality of visible items corresponding to the displayable assets.

12. The system of claim 11, wherein the first data format is a JAVASCRIPT format and the second data format is a JAVASCRIPT OBJECT NOTATION (JSON) string format.

13. The system of claim 11, wherein the processor is configured to control the rendering of the second plurality of visible items by:
merging the display object with additional display objects including additional displayable assets;
converting the merged display object into a bitmap array including the second plurality of visible items; and
rendering the bitmap array.

14. The system of claim 11, wherein the second plurality of visible items initially has an appearance and position similar to the first plurality of visible items.

15. The system of claim 11, wherein the multimedia object is a FLASH object.

16. The system of claim 15, wherein the corresponding multimedia player is a FLASH player.

17. The system of claim 11, wherein the second plurality of visible items includes animation data not included in the first plurality of visible items.

18. The system of claim 11, wherein the second plurality of visible items includes audio and video data not included in the first plurality of visible items.

19. The system of claim 11, wherein the second plurality of visible items includes vector graphic data.

20. A method, comprising:
traversing a document object model (DOM) included in a webpage configured to be generated by a web browser;
selecting a part of the DOM related to a first plurality of visible items configured to be displayed when the webpage is generated by the web browser;
recording, into respective objects according to a first data format, the part of the DOM related to the first plurality of visible items;
merging the respective objects into a collective object;
converting the collective object to a multimedia object according to a second data format, wherein the multimedia object includes the recorded part of the DOM and is compatible with a corresponding multimedia player;
decoding the multimedia object into a native object referencing a plurality of displayable assets from the multimedia object;
generating a display object including the displayable assets; and
controlling a rendering of a second plurality of visible items corresponding to the displayable assets.

* * * * *